(12) United States Patent
Garneyer et al.

(10) Patent No.: US 8,035,372 B2
(45) Date of Patent: Oct. 11, 2011

(54) MAGNETOSTRICTIVE ELONGATION SENSOR

(76) Inventors: Birgit Garneyer, Hagen (DE); Randolf Hösl, Werdohl (DE); Uwe Viola, Cary, NC (US); Rainer Heuckelbach, Lüdenscheid (DE)

( * ) Notice: Subject to any disclaimer, the term of this patent is extended or adjusted under 35 U.S.C. 154(b) by 1253 days.

(21) Appl. No.: 11/439,890

(22) Filed: Feb. 22, 2005

(65) Prior Publication Data
US 2006/0278023 A1   Dec. 14, 2006

(30) Foreign Application Priority Data
Feb. 25, 2004   (DE) ............... 20 2004 002 891 U

(51) Int. Cl.
G01B 7/14 (2006.01)
G01B 7/24 (2006.01)
G01R 33/18 (2006.01)

(52) U.S. Cl. ............... 324/207.24; 324/207.22; 324/209

(58) Field of Classification Search ............. 324/207.11, 324/207.12, 207.13, 207.15, 207.24, 209; 92/5 R; 73/313, 314, 319, 290 V
See application file for complete search history.

(56) References Cited

U.S. PATENT DOCUMENTS

| | | | |
|---|---|---|---|
| 3,898,555 A | 8/1975 | Tellerman | |
| 4,098,128 A | 7/1978 | Baumert et al. | |
| 4,900,260 A * | 2/1990 | Drogo | 439/321 |
| 5,206,586 A | 4/1993 | Yauch et al. | |
| 5,313,160 A | 5/1994 | Gloden et al. | |
| 5,680,041 A | 10/1997 | Begin et al. | |
| 5,723,870 A | 3/1998 | Crowne et al. | |
| 5,991,163 A | 11/1999 | Marconi et al. | |
| 6,232,769 B1 | 5/2001 | Brunsch et al. | |
| 6,351,117 B1 | 2/2002 | Ehling | |
| 6,434,516 B1 | 8/2002 | Topmiller | |
| 6,441,608 B2 | 8/2002 | Brunsch | |
| 6,757,635 B2 * | 6/2004 | Topmiller | 702/150 |
| 6,903,544 B2 | 6/2005 | Kurz | |
| 2001/0017539 A1 | 8/2001 | Brunsch et al. | |
| 2002/0134230 A1 * | 9/2002 | Hirling | 92/5 R |
| 2002/0135359 A1 | 9/2002 | Steinich | |
| 2003/0076089 A1 | 4/2003 | Kurz et al. | |
| 2005/0000353 A1 | 1/2005 | Nemser | |
| 2005/0017710 A1 | 1/2005 | Steinich et al. | |
| 2005/0200353 A1 | 9/2005 | Steinichb et al. | |

FOREIGN PATENT DOCUMENTS

| | | |
|---|---|---|
| AT | 006056 | 7/2001 |
| DE | 4316046 | 7/1994 |
| DE | 4316046 C1 | 7/1994 |
| DE | 19820167 | 11/1998 |
| DE | 10108925 | 2/2001 |

(Continued)

OTHER PUBLICATIONS

Magnetostriction Basic Physical Elements (MTS Sensors Group).

(Continued)

*Primary Examiner* — Kenneth J Whittington
(74) *Attorney, Agent, or Firm* — Steven M. Koehler; Westman, Champlin & Kelly, P.A.

(57) ABSTRACT

A magnetostrictive position or elongation sensor of the type in which an elongated magnetorestrictive waveguide is influenced by a magnetic field from a moving magnet has a Villary type transformer at one end and a hermetically sealed housing containing the signal processing circuitry on a plurality of circuit boards. The signal processor can switch the sensor into a programmable mode in which a diagnostic output is obtained recognizing the magnet, the presence of the sensor in the programming mode and voltage values.

40 Claims, 8 Drawing Sheets

FOREIGN PATENT DOCUMENTS

| | | |
|---|---|---|
| DE | 10113716 | 3/2001 |
| DE | 10234960 | 7/2002 |
| DE | 102 01 880 | 7/2003 |
| DE | 10234960 A1 | 2/2004 |
| DE | 10201880 B4 | 5/2004 |
| EP | 0442985 B1 | 8/1990 |
| EP | 1306651 | 6/2002 |
| EP | 1571425 | 9/2005 |
| GB | 2130025 | 9/1983 |
| WO | WO 2004013577 | 7/2003 |

OTHER PUBLICATIONS

Using Ingress Protection (IP) Ratings . . . (Rice Lake Weighing Systems—2001).

Official Search Report of the European Patent Office in counterpart foreign application No. EP 1571425 B1 filed Nov. 9, 2004.

Selected non-translated prosecution documents from the European Registry, EP1571425 granted Sep. 7, 2005, with index listing all prosecution documents available from the EPO.

Translations of the selected documents (Reference AL) from the European Registry, EP1571425, granted Sep. 7, 2005.

Press Release "MTS Temposonics Inc built-in diagnostics to sensor designs" dated Feb. 23, 2004, pp. 1-2.

High Beam Research "MTS Boosts The Tempo For Position Sensing", Apr. 1, 2002, pp. 1-3.

Prospectus "Linear way sensors", Turck Ltd. &Co. KG, Apr. 2002, pp. 1-16.

Data Sheet "Linear way senors", Turck Ltd. &Co. KG, Apr. 2002, pp. 1-6.

Internet extract, PC/104 Embedded Consortium, 2009, pp. 1-2.

Press Release, Temposonics® Linear Position and Liquid-Level Sensors, 2006, pp. 1-3.

Ametek Patriot Sensors, "Ametek Patriot Sensors Series 955S, Gemco Smart Brik™ Linear Displacement Transducer Installation and Programming Manual", Ametek, Oct. 2000, pp. 1-4.

Ametek Patriot Sensors, "Ametek Patriot Sensors Series 955S Gemco Smart Brik Linear Displacement Transducer Installation and Programming Manual", Ametek Oct. 2000, pp. 1-2.

Turck Inc., "Turck works EZ-track Linear Displacement Transducer", Turck works, Nov. 2001, pp. 1-6.

Ametek Automation & Process Technologies, "Ametek Gemco Linear Displacement Transducers Ordering Guide and Technical Information", Ametek, Oct. 2001, pp. 1-57.

Balluff, "BTL5-A/C/E/G_ _-M/U -B/Z-S32/KA_ _, MicropulseTM Linear Transducer - Rod Style" Balluff, Nov. 1998, pp. 1-8.

Gebard Balluff GmbH & Co., "Generationswechse1 Transsonar Wegaufnehmer-Stab BTL2/3...B/Z BTL5...B/Z Micropulse" Balluff, Oct. 1998, pp. 1-6.

Balluff GmbH, "Technische Beschreibung Betriebsanleitung BTL5-A/C/E/G_ _-M_ _-A/B/Z-S32/KA_ _", Balluff, Sep. 2003, pp. 1-61.

Prospectus of company Samtek on PC/104, 1992.

* cited by examiner

MAGNETOSTRICTIVE ELONGATION SENSOR

FIELD OF THE INVENTION

My present invention relates to a magnetostrictive elongation sensor, i.e. a sensor capable of determining the degree of relative movement of two parts in a longitudinal direction, the elongation of a member or the stretch in a member or structure. More particularly this invention relates to an elongation sensor of the type which can output elongation dependent signals from a magnetic field sensitive sensor element and which has a signal processor and optionally a diagnostics output which can be provided in a housing and which can cooperate with a shiftable magnet or magnets which act upon the sensor element.

BACKGROUND OF THE INVENTION

Elongation sensors of that type are known in the art in a variety of configurations and reference may be had, in that connection to German patent document DE 102 01 880 A1 and US patent application publication US 2005/0017710 A1.

Such a magnetostrictive elongation sensor has as a rule a wire-like or tubular waveguide extending in a measurement direction and provided from a magnetostrictive material. By means of a position magnet which is displaceable relative to the waveguide and along the waveguide, the contactless application of a magnetic field to the waveguide can result in a mechanical elastic wave therein. That mechanical elastic wave spreads in both directions along the waveguide and can be detected by the signal processing circuit as an end of the waveguide. From the propagation time of the wave along the waveguide, the exact spacing of the position magnet from the end of the waveguide can be determined and thus the position of the movable component, element or point to which the position magnet is affixed.

The waveguide is usually received in a support body, for example a tube, in order to provide a mechanically stable mounting of the sensing element and to permit it to be affixed to a component with respect to which the movable point is displaceable. The electronic parts forming the signal processor, for example, are usually arranged at one end of the waveguide. These can include a detector coil, a Villary-effect strip, the signal processing circuitry and optionally a diagnostic output. All of these elements can be provided in a housing and thereby protected against environmental effects.

On a machine to be monitored, it is not uncommon to provide a number of such elongation or longitudinal displacement sensors. At standstill of the machine it is important to be able to identify possibly defective parts of the apparatus as quickly as possible to thereby keep production losses to a minimum. Since both maintenance and restoring the apparatus to full production can result in operational interruptions or lags, it is essential to be able to diagnose a possible failure of the sensor as quickly as possible.

There are in the art sensors having BUS type interfaces which have been described as having optical diagnostic outputs. However, these optical diagnostic outputs themselves are exclusively provided by the BUS communication.

OBJECTS OF THE INVENTION

It is the principal object of the present invention to provide an elongation sensor of the aforedescribed type which enables a rapid and exact identification of a deflective part.

Another object of this invention is to provide an improved elongation or longitudinal position sensor of the magnetostrictive type with more effective protection against environmental effects, which is more easily monitored with respect to diagnostics and which has improved shielding by comparison with earlier systems.

It is another object of this invention to provide a sensor of the magnetostrictive type which is free from drawbacks of the prior art systems.

SUMMARY OF THE INVENTION

These objects and others which will become apparent are attained with magnetostrictive elongation sensor outputting an elongation or longitudinal position signal which comprises:
   a magnetic-field-sensitive sensor element in the form of a waveguide and forming a signal generator;
   a signal processor connected to the signal generator and having a diagnostic output;
   a housing receiving the signal processor and at least an end of the sensor element; and
   a shiftable magnet generating a magnetic field affecting the sensor element,
      the signal processor being constructed and arranged to switch the elongation sensor into a programmable mode in which the diagnostic output encompasses at least one of the following detection elements:
         a sensor unit for a function of the sensor element capable of recognizing a magnet,
         a sensor unit for a function of the elongation sensor finding itself in the programming mode, and
         a sensor unit for monitoring voltage with at least two voltage values different from zero.

Preferably the diagnostic output includes an infrared interface.

It has been found to be advantageous, further, when the diagnostic output includes an optical output element which can encompass a visible light or light in the visible wavelength range so that at least some aspect of the diagnostic can be recognized by the eye of the viewer.

Furthermore, it is preferred for the diagnostic output to encompass at least two of the sensor elements or units previously described.

Because of the optically differentiable diagnoses which can be carried out in accordance with the invention, defects at a corresponding apparatus or component can be relatively rapidly and simply identified which, in turn, enables replacement of the exact magnetostrictive elongation sensor of the machine which is found to be defective. Superfluous replacement of sensors which in the past may have falsely indicated a defect is no longer required.

According to the invention, the voltage is monitored to determine whether the requisite voltage is applied or not and whether the voltage which may be applied is in the permissible voltage range or not. The invention also allows determination as to whether, following the programming of the sensor, the programming for the desired function of the sensor has been. concluded or whether the sensor may still be in a programming mode which must be concluded before the sensor is placed in operation.

The invention can also establish whether the magnet on the monitored component is positioned too far away from the waveguide or even possibly positioned outside the measurement range. The corresponding data can be read out for example via the infrared interface with a palm or like electronic reader which not only can indicate the occurrence of a defect but the significance or value of the defect.

According to a further feature of the invention, the signal processing can be such that an elongation value outputted by the signal generator is converted by an output signal generator of the sensor into a digital or analog output signal. The circuitry within the housing can include an interconnection circuit or network which is located between the output signal generator and an output to which the elongation dependant signal is applied. To reduce shock and vibration sensitivity and to limit or prevent the coupling into the system of stray signals or noise, at least one of the electrical connections between the signal generator and signal processor and between the output signal generator and the interconnection circuit should be formed as a cable-free or wireless connection between separate circuit boards.

The sensors of this general type known in the art generally have a single circuit board of which substantially all of the electronics are mounted, thereby leading to magnetostrictive elongation sensors with large volumes and high sensitivity to shock and vibration. When, in accordance with the invention, the electronic circuitry of the sensor is divided and provided on a multiplicity of circuit boards, this problem can be eliminated as will be described below.

When, in the past a multiplicity of circuit boards were provided and were wired to each other there was always the danger that wiring errors could arise. Furthermore, the wiring could function as antennae and pick up noise or otherwise make the sensors sensitive to external electromagnetic fields. Shock-produced cable breakage could occur.

With the system of the invention in which at least two of the boards are connected by a wireless connection and advantageously all of the boards can be interconnected by wireless or cableless connections, a highly compact construction can be provided with a minimal volume and maximal shock and vibration resistance which is less sensitive to noise and more convenient to fabricate. At least the signal conversion parts of the circuitry should have a cableless connection thereto.

According to a feature of the invention at least one of the connections mentioned above is provided as a plug connection. When we refer here to a plug connection, we mean a connection in which a plug can engage a jack. In an especially preferred embodiment the signal generator is connected in a cable-free or wireless connection with a first circuit board, the latter is connected with a second circuit board with signal processing elements by a plug connector and the latter with a third circuit board with output signal generator elements also by a plug connection. The three circuit boards can all be interconnected by plug connectors in a preferred embodiment.

To provide an especially compact construction and to minimize noise pickup, the three circuit boards can be arranged parallel to one another with the first printed circuit board between the second and third printed circuit board and the electronic elements mounted on the sides of the second and third boards which face the first board.

The first board can be provided with a bandpass filter. The first board can be directly connected with the waveguide of the signal generator.

According to a further feature of the invention, the third board is connected with a fourth board carrying the interconnection circuitry by a plug connector. The fourth board can be mounted on the stack of the first three boards at a side thereof turned away from the waveguide or the signal generator formed thereby and at a right angle to the first three boards so that edges of the first three boards are located adjacent the surface of the fourth board turned toward the waveguide.

The individual boards can be assembled into a compact stack and interconnected by plug connectors so that the volume of the board assembly is especially small.

The waveguide can be provided with a signal generator in the form of a Villary-effect transformer which outputs the elongation-dependant value. With an elongation sensor thus equipped, vibrations can be mechanically coupled to the sensor and can be superimposed on the measurement signal and lead to errors in prior art devices. The output signal of a Villary transformer are applied to a comparator through amplifying stages for further processing. It is possible in such cases to amplify the raw signal excessively and prevent adequate separation between the signals and noise (low signal/noise ratio). Filters are then required to filter out the noise.

To avoid these drawbacks, according to the invention, between the signal processor and the sensor element, for example the waveguide, a passive bond pass filter is provided.

The use of an appropriate electrical filter to minimize the environmental effects like those of shock and vibration, utilizes the fact that the shock and vibration produce low frequency affects which are superimposed upon the measurement signal. With the band pass filter the frequency contributions of shock and vibration can be filtered out so that other effects upon the measured value can be eliminated. Preferably the band pass filter is a high pass filter.

According to another feature of the invention, the band pass filter is provided together with the Villary transformer on a common carrier, i.e. the same printed circuit board. In that case the band pass filter will be a shock and/or vibration filter in the sense described above.

The invention also relates to an elongation sensor in accordance with the principles of the invention previously described which has a signal processor receiving the output of the signal generator formed by the waveguide and produces an elongation-dependent value which, upon further processing, gives rise to the output signal of the unit.

In industrial applications, such sensors are subject to strong electromagnetic effects which introduce noise to the measured signal. These electromagnetic effects can be produced by electromagnetic machine drives (motors), frequency converters or welding apparatus in the vicinity. In some cases, the noise can exceed predetermined thresholds which can render the measured signal indiscernible or can mask the measured signal. The possible coupling of the noise to the sensor therefore requires steps to prevent or limit the incursion of such noise.

In the past individual components have generally been enclosed in a shield which, however, may not adequately shield the wiring to and from those components.

In accordance with the present invention, the sensor element is surrounded by a first shield, especially a housing of an electrically conductive material such as sheet metal and this first shield is surrounded by an insulating shell closely fitted to the first shield and a second shield, especially a housing of electrically conductive material such as sheet metal, surrounds the insulating layer. The shiftable magnet is disposed externally of that second shield. The system of the invention greatly reduces or completely eliminates noise from the electromagnetic effects mentioned previously.

Preferably the signal generator formed by the waveguide and the signal processor are provided on a common carrier within the first shield, i.e. on the same printed circuit board. If the common carrier is not a printed circuit board it can be a hybrid circuit.

It has been found to be advantageous in addition for the circuit boards and especially the first, second, third and fourth circuit boards to be received within the housing formed by the first shield and, therefore, within the second shield as. well, the latter surrounding the first shield.

The housing forming the first shield can be provided with guide grooves into which the boards can be slid and which serves to receive the boards, to guide them and to hold them in position. Alternatively, some or all of the boards can be fitted into a shape stable auxiliary housing which is received in and surrounded by the first shield. In this case electrical content between the boards and the first shield can be avoided and mechanical mounting can be achieved while insulation from the first shield is ensured.

In earlier sensor systems, it frequently has not been possible to obtain the protection required for an IP 67 rated protected product. An IP 67 rated protected product is one which has an ingress protection (IP) rating such that the system is totally protected from dust and is protected from the effect of immersion between 15 cm and 1 m. Such protection is particularly. desirable when the sensor is to be used on a machine like a drilling or boring machine which produces very fine particles and uses cutting fluids or coolants.

As a result of contamination from dust or other particulates and the penetration of oil or coolants through capillaries in the housing or other structures of such sensors, the sensor can fail.

According to the invention, however, the housing is formed as an open hollow profile and is closed at its ends by respective covers-and between each cover and the respective mouth of the housing a profiled seal is provided which, on the one hand, has a planar region sandwiched between and abutting planar regions of the cover in housing. In addition, each seal has a second region forming a lip seal against a wall of the housing just inwardly of the mouth. The seals are generally annular and projections on the cover extend through the seals into the housing.

The covers can be affixed by screws to the housing and the flat portion of the seal can have bores through which the screws pass and which are located inwardly of the periphery of the seals. Because of the multistage sealing between cover and housing, the housing is reliably and permanently sealed so that ingress protection of the IP 67 type is readily obtainable.

According to yet another feature of the invention a portion of the housing has an optically transparent window through which an optical signal transmitter within the housing is accessible form the point of view of optical signal transmission. This window can be formed by a body of transparent material filled into an opening of corresponding shape in a wall of the housing or of the cover. In the past, windows for optical transmission have been pressed into the housing or cemented thereon and generally because of fabrication tolerances and differences in thermal expansion, it has been impossible to prevent the formation of cracks or gaps through which liquids could enter the housing.

With the invention this is avoided by providing the body with a circumferential groove in which an O-ring or like seal is received and is compressed against the wall of the opening. The body has a shoulder which can engage an inwardly extending ledge of the wall portion to fix the window in the housing with the outer wall surface of the window slush with that of the wall which it is received. The yieldable seal here can compensate for temperature dependent dimensional changes and prevent the penetration of liquids or the like into the interior.

According to the invention, the sensor has at least one plug fitting on a housing part, especially on a cover of the housing and which can receive a plug or jack and whose shield is connected with the shield formed by the housing or cover.

While it is customary in earlier systems to provide plug connections on a housing, generally such connections are pass throughs traversing the cover. In that case, the plug can take up considerable space, especially if the electrical connector is of the screw type or bayonet type.

The invention can minimize the space required for the plug connector by having the outer shield formed by the outer member of the housing, in one piece with the shield of the plug or jack connector. The connector fitting can be provided with an external or internal thread to accommodate the plug or jack to be inserted therein. Where the cover is composed of metal it may be provided with two or more such fittings. With a one piece configuration of the fitting and the housing cover or other housing part, a screw assembly of a connector to the housing is not required and a more compact configuration is achieved. Furthermore, the one piece formation of te fitting as part of the housing measures freedom from cracks or the like which can allow contaminants into the housing.

According to another feature of the housing a signal output is provided from the housing.

In practice, high flexibility of installation of the sensor on a machine and avoidance of defective connections is important. The output on the housing enable a programmer to be connected to the unit to enable the sensor to be programmed, especially in the case of an analog signal output. The signal lines of the signal output should be protected against short circuiting and the application of stray voltages. It is also important to be able to detect when the sensor is in a programming mode and when, for example, an output signal fails in a measuring mode.

The sensor for the output connection can thus monitor an output signal and can provide an input in the programming mode which upon failure causes switchover to the measuring mode optionally with a time delay. The device connected to the output can be switched over to detect stray voltage, short circuit or modulated serial data. A time window can be provided for switchover.

According to a feature of the invention the signal output is monitored by a sensor for the output wiring. When input signals (data) are fed to the wiring, the sensor switches automatically to the programming mode. Analogously, the sensor can switch to the measuring mode for output signals to the extent no input signals are detected, optionally after a short time period which is given by the time window.

The signal lines for the measured value are monitored by the sensor as well. Should the sensor recognize that the signal lines have been connected to a programming device, the sensor can then switch itself into the programming mode. This operational status can detect in sequence strong voltage, short circuit or modulated serial data. For security or reliability it is then reasonable to carry out this sequence change within a predetermined time window after it has been initiated. This is not however compulsory.

The sensor can also detect the type of programming device, for example, a PC or a hand-held programmer and respond to a single wire bus with an analog output or via a four wire bus or two wire bus with a binary output to call up diagnostic data, generate parameters and adjust the system.

The type of data which can be drawn from the programming unit or delivered thereto can include diagnostic data interrogatories (software version, serial number, gradient measured cycling time, manufacturing data, nature of the output signal, memory failure signals, defective positioning signals, voltage for auxiliary energy, voltage of the sensor element).

Manufacturing Details

Excitation Currents Matched to the Sensor Length.

Details as to whether the sensor element responds automatically or based upon programming at fixed or variable values.

The nature of the triggering of the measurement, external free running synchronized.

Parameters of the output signal (start stop) or pulsed with modulation, type of reflection of the start signal, the nature of average value formation, selection of the measurement direction, selection of the resolution of the measured value, selection of the signal stroke with an analog output)

Adjustment of the Displacement and Speed Adjustments (Start and End Values)

It is customary in earlier systems to provide digital sensors with BUS interfaces (PROFIBUS, CAN or the like) which can have their parameters set over the bus. With analog sensors the usual parameters (for example 0 to 20 mA or 4 to 20 mA) are established by the hardware and can be modified with open sensors by switches, jumpers, bridges or component replacements. The setting of the 0 point or the end point is carried out by pushbuttons or potentiometers which are accessible through a housing opening or potentiometers which are activated by means of magnets through a housing wall. With the start/stop interface it is possible to read out the serial number, the measurement length, the transit time gradient, manufacturing information and the date on which the device was made by means of a modified start pulse lying the signal wiring. It is already known in addition to replace corresponding buttons by read switches which can be actuated by magnets though the housing wall.

With the system of the of the invention, the adjustment can take place in the field. The removal of the sensor is not required. Parameter setting, sensor diagnosis can be carried out at any optional location of the wiring between the sensor and the control, even in a switching closet so that even sensors which are accessible only with difficulty can be adjusted in place.

According to another feature of the invention the adjustment of the sensor can be simplified in the manner described below. It is recognized in the art that for various purposes different hardware paths may be desired (start/stop or pulse width modulation). Small adjustments like the setting of the zero point can be carried out by mechanical or digital potentiometer settings, change of components like resistors, switches or bridges. However, the invention also enables adjustment in place or prior to mounting simple means and permitting a detail diagnosis to be obtained in the case of failure. In this case the displacement or elongation sensor of the invention has an optical interface enabling at least one of the following elements or devices to be connected:

Diagnosis output memory,

Measured value output memory,

Measured output device,

Signal type detection device (for example a reader or signal varying element, start/stop element, pulse width modulator, analog signal detector)

Device or element for setting pulse width, for recognizing the type of reflection of the start signal or for determining an external or free running measurement.

A Device or Element for Averaging Over a Number of Measurements

With the optical interface at least one of the functions assigned to this group of devices or elements can be carried out. For instance, for example, the output can provide diagnostic information like version number, serial number, fabrication date, measurement rate transit time constants, memory errors, position detection failures, auxiliary energy voltage, sensor element voltage, etc. The measured value output can be delivered by the interface as well. Furthermore, the signal type of the output can be read and changed and a detection allowed as to whether the signal is a start/stop signal, a pulse width modulation signal, an analog signal, a 0 to 10 V, signal a −10V . . . +10 V signal, a 0 to 20 mA, signal or a 4 to 20 mA signal. The interface can match the output signal as may be required and allow both zero point and n value adjustments. For example pulse width settings, reflection type for the start signal and switchovers between external and free running measurements can be made there as well. The interface can also carry out the averaging over 1 to n measurements.

The adjustment in place can be carried out with simple means and can enable a detail diagnosis to be made without interfering with anything of the adjustment features described. The removal and opening of the sensor is not required.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
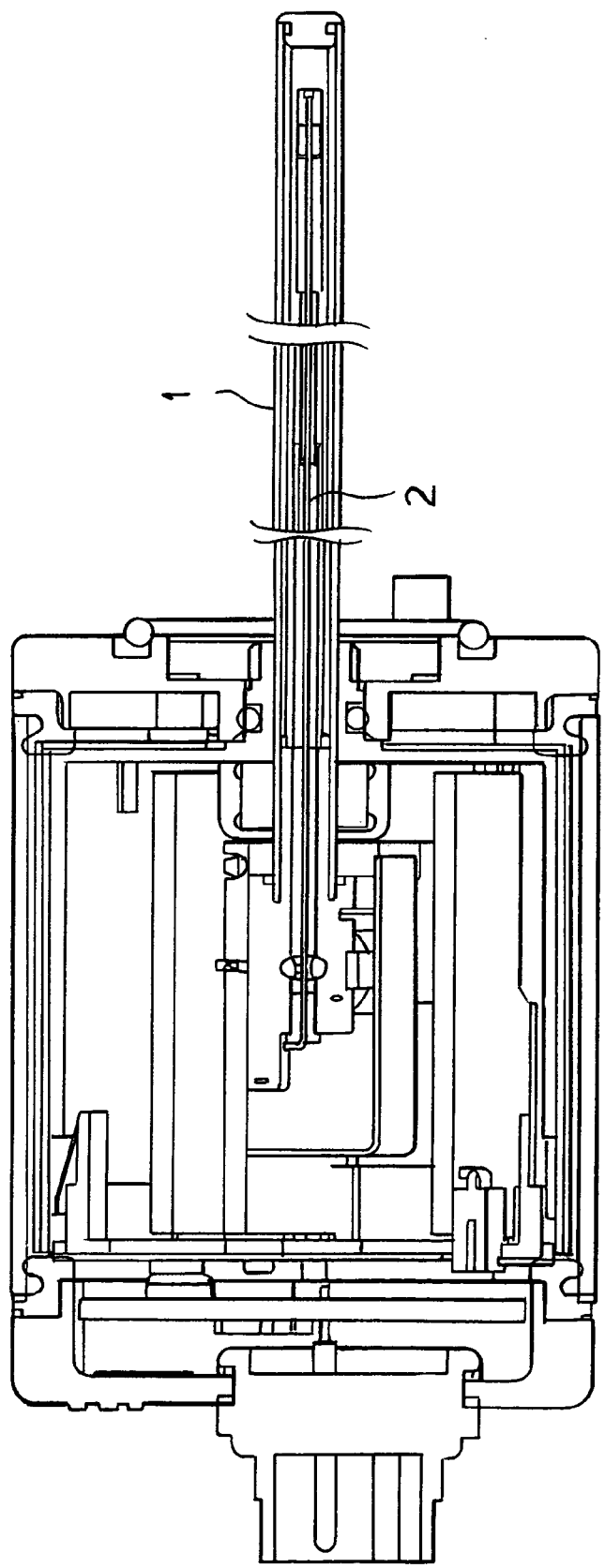
FIG. 1 is a diagrammatic elevational view, partly broken away of a magnetostrictive elongation sensor in accordance with the invention.
Figure 2:
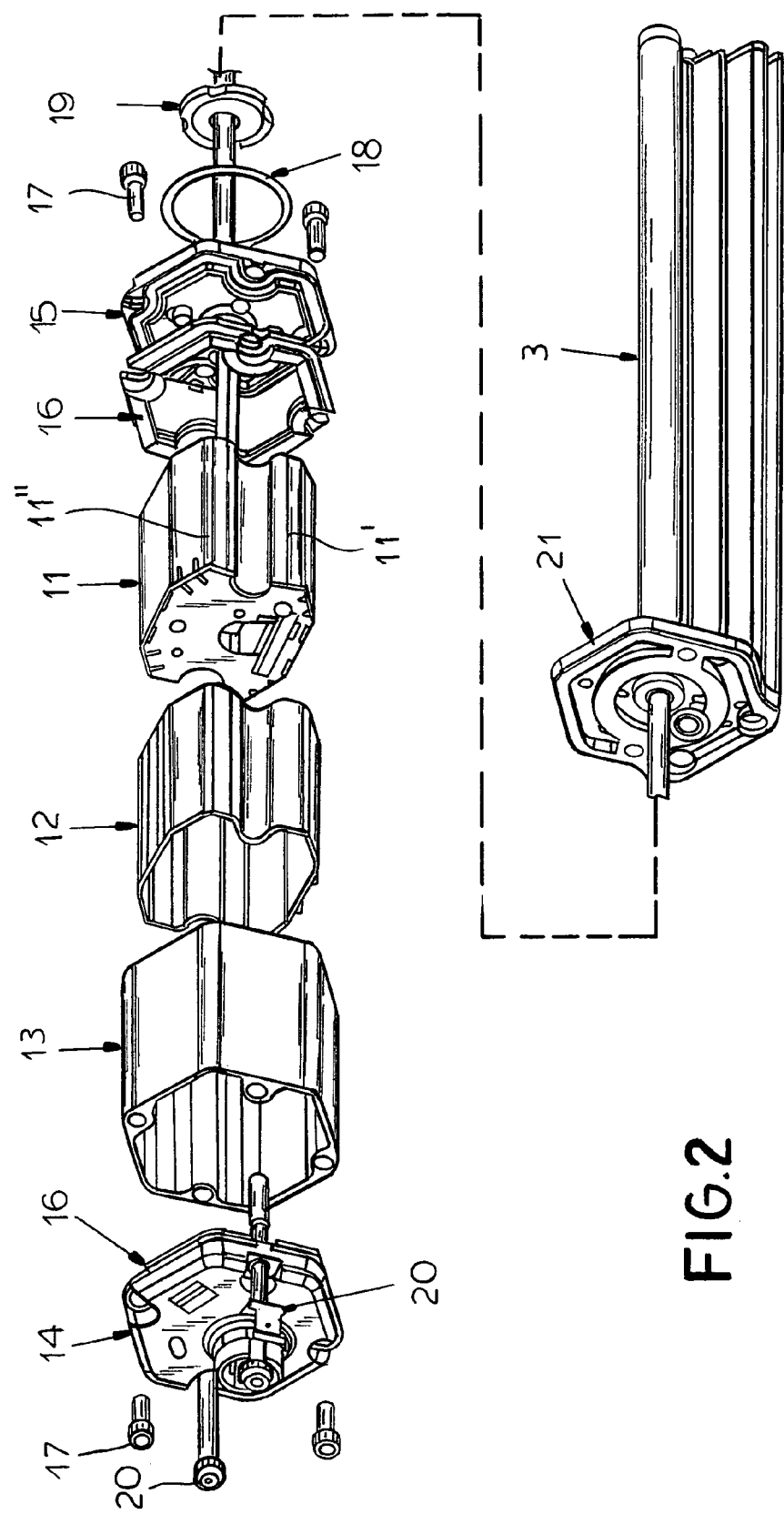
FIG. 2 is a somewhat diagrammatic exploded view of the elongated sensor.

FIGS. 1 and 2 show in highly diagrammatic form a magnetostrictive elongation sensor for outputting an elongation or longitudinal displacement-dependent signal. In this device, a magnetic wave waveguide 2 is provided in a protective tube 1, the protective tube 1 being enclosed in turn in a support body 3.

Figure 3:
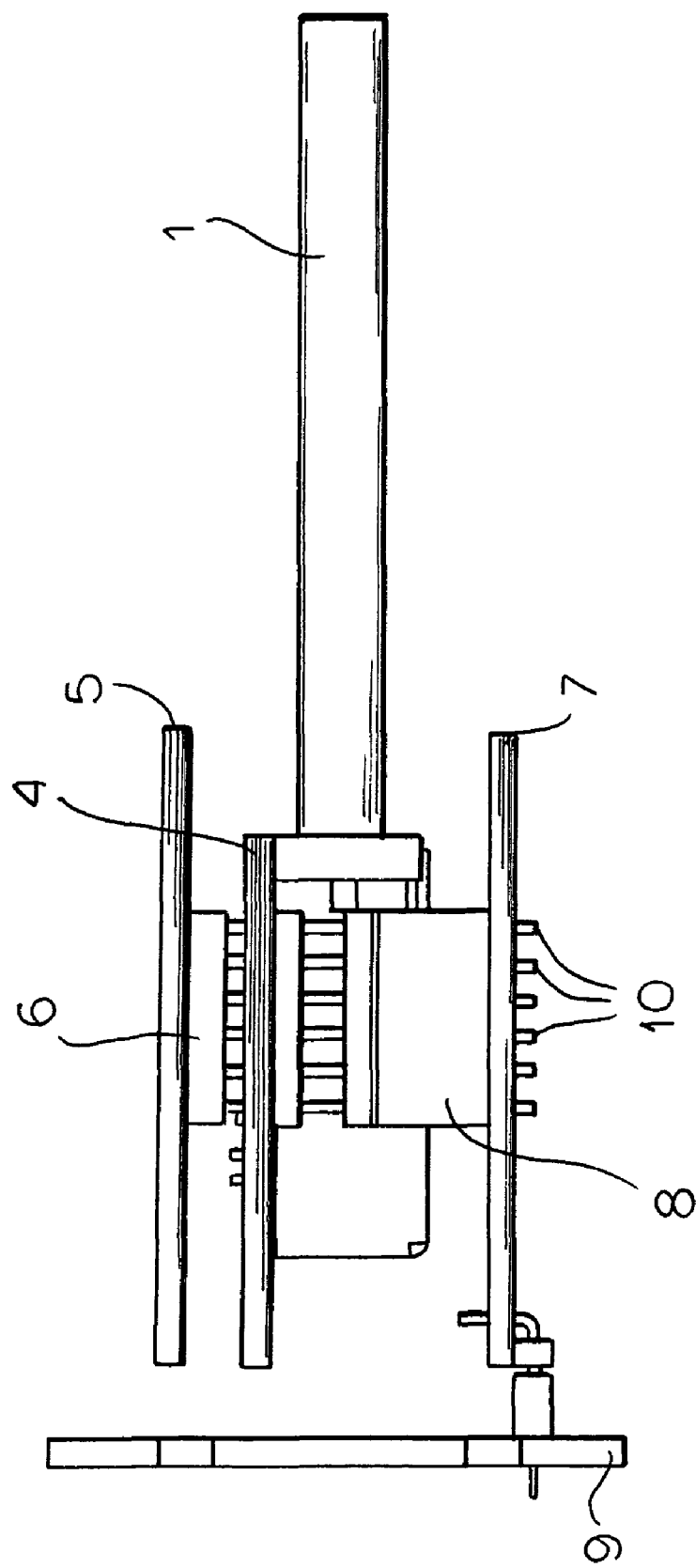
FIG. 3 is a diagrammatic detail of the assembled device of FIGS. 1 and 2 showing a detail thereof.
Figure 4:
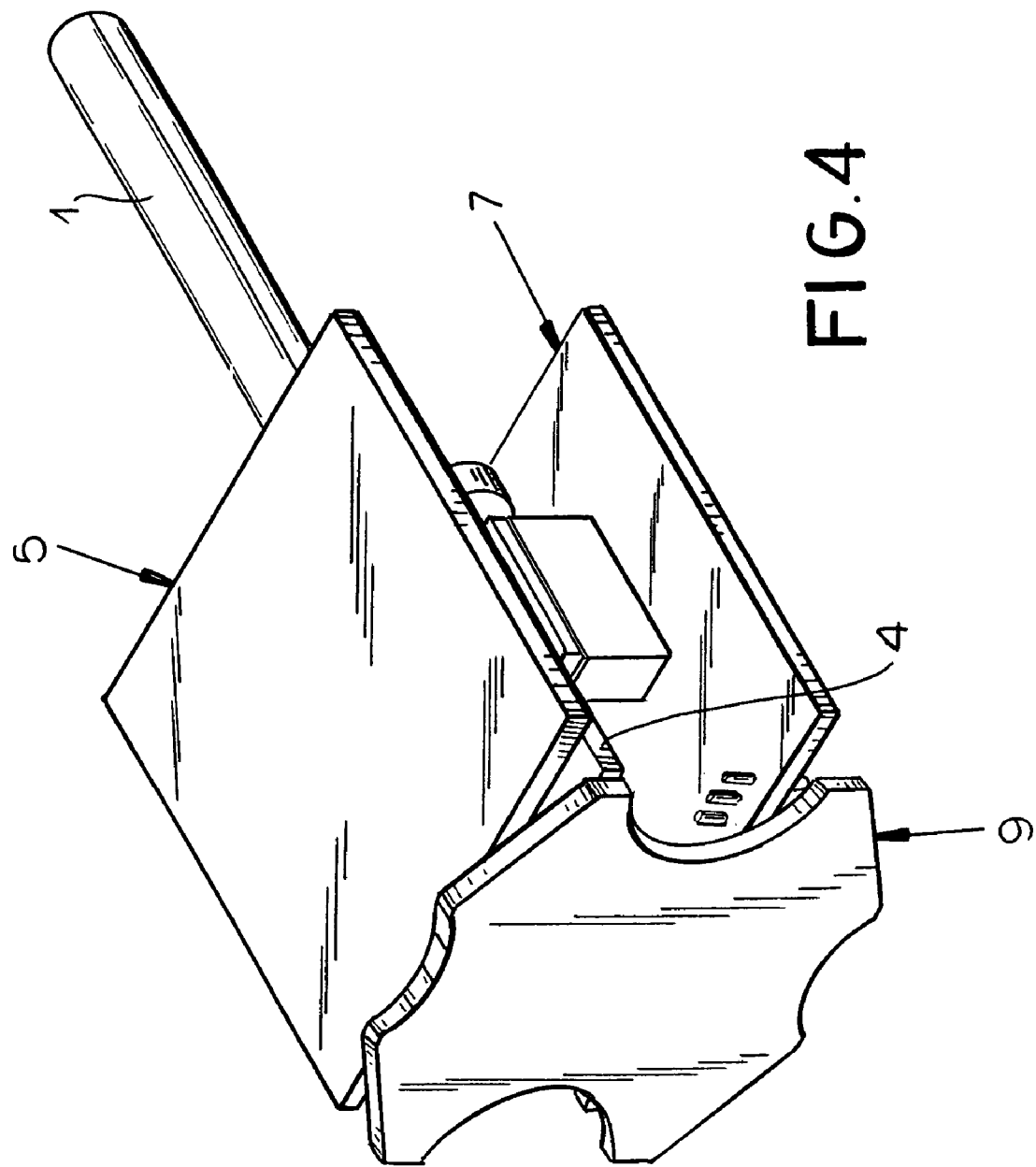
FIG. 4 is a perspective view of the detail of FIG. 3.

The electronic components are combined substantially in a unit which has been illustrated in FIGS. 3 and 4. This unit encompasses the electronic components which can include a Villary strip and a detector coil. The Villary strip is, of course, a strip of metal which may use a magnetoelectric effect or Villary effect and is a change in the longitudinal magnetic properties, for example, the permeability of the ferromagnetic strip which can be caused by a distortion in the longitudinal direction. The effector coil can pick up such a permeability change in a magnetic field by the induction principle and transform it into an electrical signal which is thereby made available for electronic signal conditioning. As a result this system can also be referred to as a Villary transformer.

The components shown in FIGS. 3 and 4, therefore, can include a first circuit board 4 which can be directly connected to the signal changer 1 and on which, for example, a band pass filter can be provided, a second printed circuit board 5 carrying the signal processing elements or circuit 6, a third printed circuit board 7 with the output signal generator elements, circuits or components and a fourth printed circuit board 9 with the elements of the interconnection circuit.

The first circuit board 4, as has been noted, directly connected with the waveguide system, all of the circuit boards are interconnected by plug connectors, i.e. plug-and-jack connectors, whereby the first, second and third boards 4, 5 and 7 are spaced apart but parallel to one another, one above the other and interconnected by plug connectors 10. These three circuit boards form an assembly which can be turned on edge to the signal generator or waveguide assembly. The board 9 is oriented at a right angle to the board stack 4, 5, 7 so that a highly compact assembly of the boards is provided.

The unit shown in FIGS. 3 and 4 is surrounded by an insulating shell and this, in turn, is enclosed in a first shield 11 in the form of a housing. On this shield 11 (FIG. 2) an insulating sleeve 12 of the same general shape is provided. The sleeve 12 is so dimensioned that it can be slid onto the shield 11.

Surrounding the insulating sleeve 12 is a second shield 13 in the form of a metal housing. The shields may all be grounded.

Figure 8:
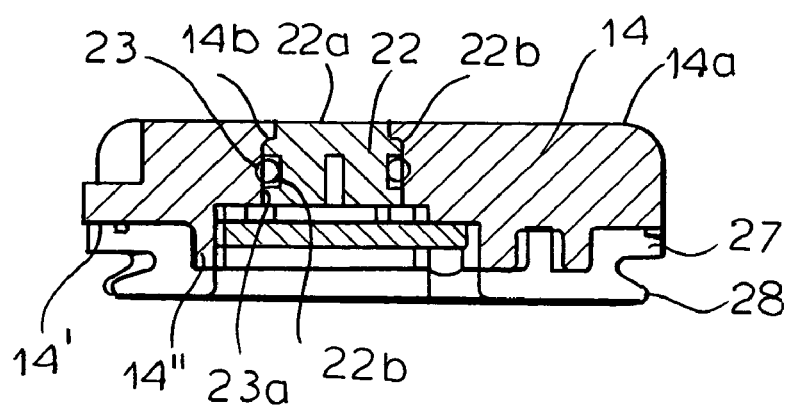
FIG. 8 is a cross sectional view taken along the line VIII-VIII of FIG. 7.
Figure 10:
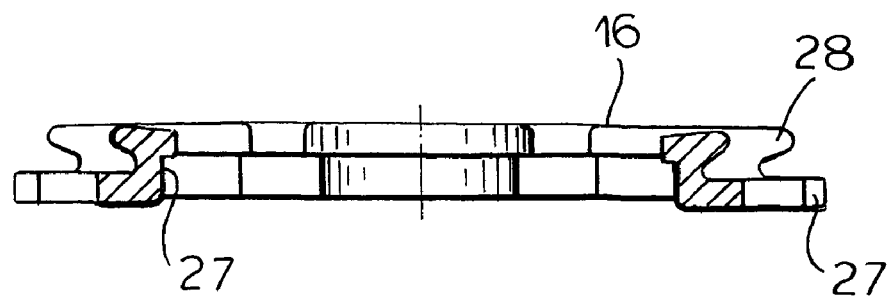
FIG. 10 is a cross sectional view of the latter detail.
Figure 9:
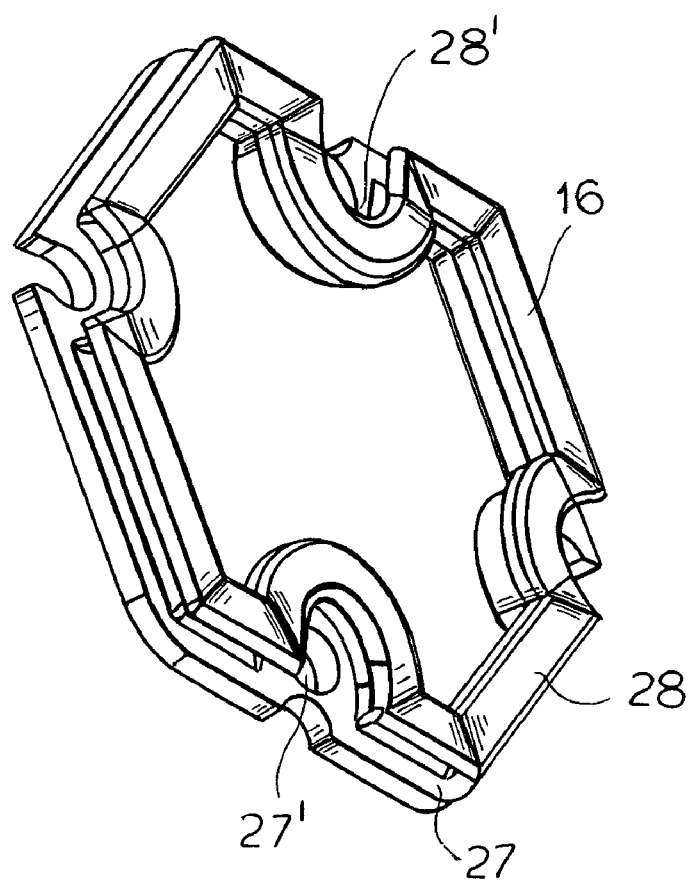
FIG. 9 is a perspective view of another detail of the device.

The thus-formed unit is closed at its ends by covers 14 and 15 and seals 16 can be provided between these covers and the ends of the shield 13. The seals are best seen in FIGS. 9 and 10 and the cover 14 has been shown in detail in FIGS. 7 and 8.

Thus the corresponding cover and seal arrangements for the unit shown in FIG. 2 have been illustrated in FIG. 7 through 10.

The connection of the covers 14 and 15 with the housing formed by the shield 13 is effected by means of screws 17. A further fastening element 19 cooperates with a sealing ring 18 to tie the sensing unit to the housing and screws 20 traversing the cover 14, the housing 13, the seals 16, the plate 15 extend into the cover art 21 (FIG. 2) to join the sensing element to the housing.

The housing art 11 can have guide and insertion grooves, e.g. as formed by the corrugated portion 11' and 11", in which the edges of the circuit boards 5-7 can be inserted and fit snugly.

The seals 16 are formed as multistep profile seals (see FIGS. 9 and 10 in particular) and can comprise a flat or planar region 27 which can engage between the planar end faces of the housing and the cover. The planar portion 27 is provided with bores 27' through which the tie bolts 20 can pass. A second region of the seal 16 is shown at 28 and constitute a lip which is axially spaced from the planar portion 27 and sealingly engages the inner surface of the housing. In FIG. 8, the planar portion 27 is shown to lie against the flat or planar portion 14' of a cover 14. The planar portion 27 is annular and has a window 27" in which an axial projection 14" of the cover 14 is snugly received. The seal lip 28 has indentations 28' at the bores 27' which engage around the screws 20.

Figure 7:
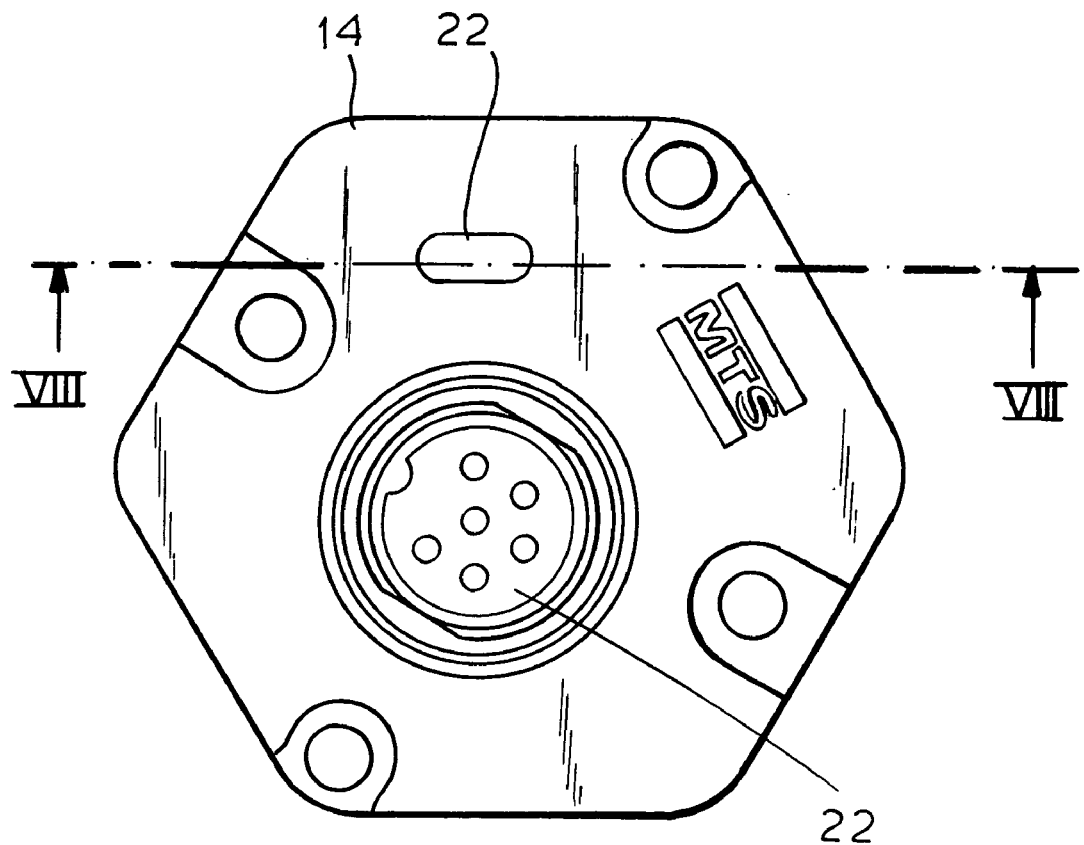
FIG. 7 is an elevational view of the detail shown in FIG. 6 from the end not visible in that Figure.

As can be seen especially from FIGS. 7 and 8 as well, a body 22 can be received in the cover 14 and can be transparent to form a window through which an optical signal transmitter shown through that window at 22' can output an optical signal. The body 22 is flush with the outer surface 14a of the cover at its wall 22a and can be provided with a circumferential groove 22b receiving an O ring 23 which is compressed against the surrounding wall 23a of an opening in the cover 14 accommodating the body 22. On the interior of the cover 14, the body 22 can have a shoulder 22b engaged against an inwardly extending ledge 14b of the cover 14 to hold the transparent body in place.

Figure 5:
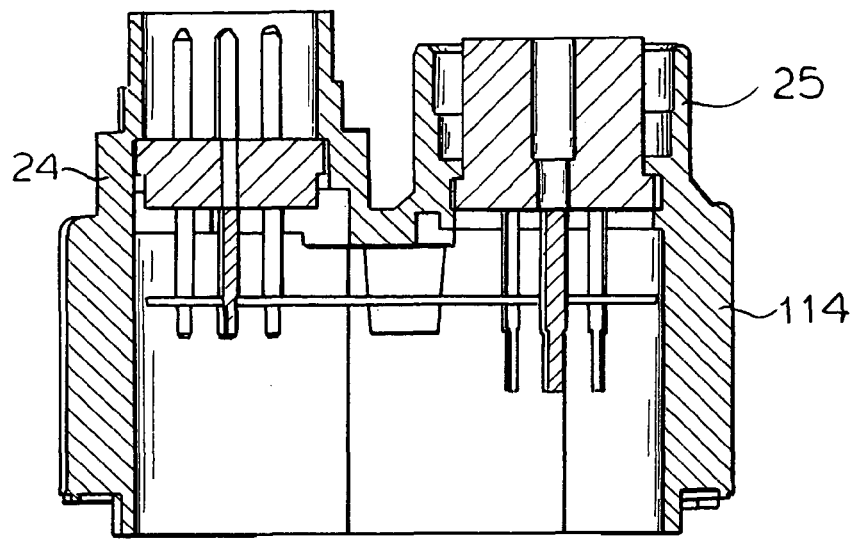
FIG. 5 is a cross sectional view of a further detail drawn to a larger scale.
Figure 6:
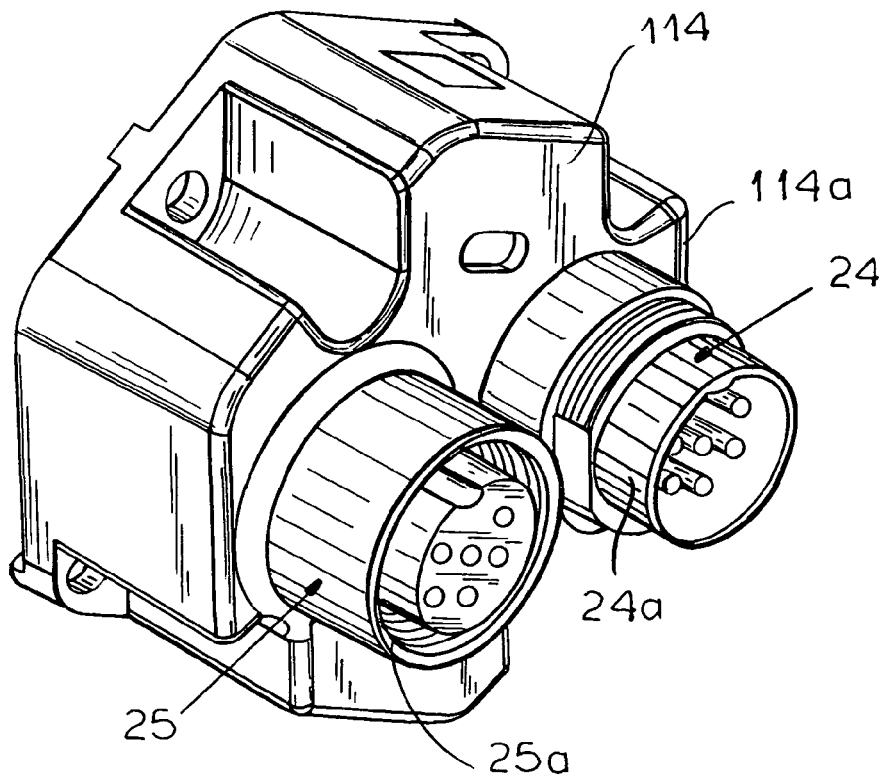
FIG. 6 is a perspective view of the latter detail;.

FIGS. 5 and 6 show another construction for a cover 114, which can be used as a substitute for the cover 14 and has two plug-shaped outputs 24 and 25, one of which can receive a jack and the other a plug. The outer shielding 24a and 25a of these connectors are formed in one piece with the housing body 114a so that no additional seal or shielding is required for the plug connectors. The one piece connector shield is a space-saving feature which allows direct connection of plugs or jacks to the sensor.

Figure 11:
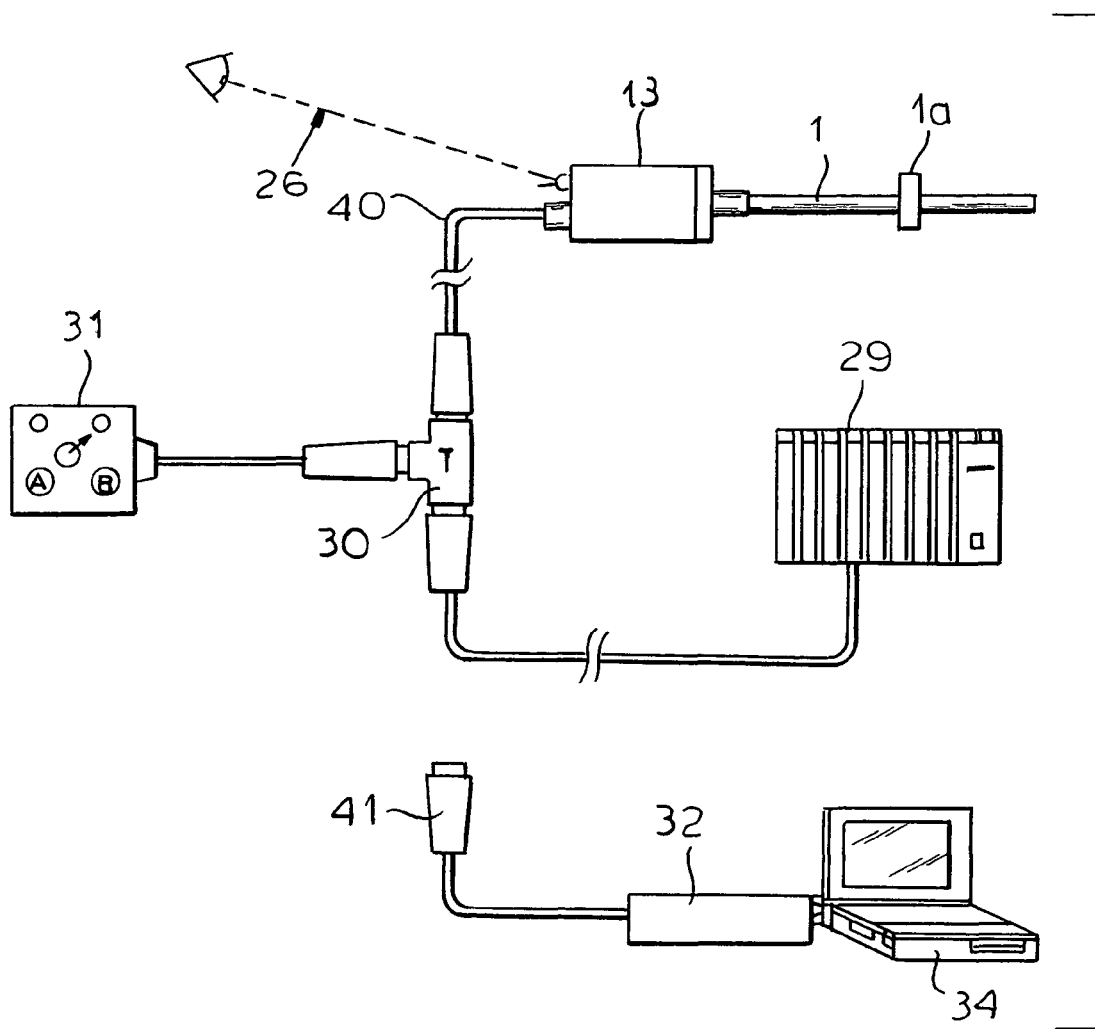
FIG. 11 is a diagram showing the operative elements of the elongation sensor and their interconnections.
Figure 12:
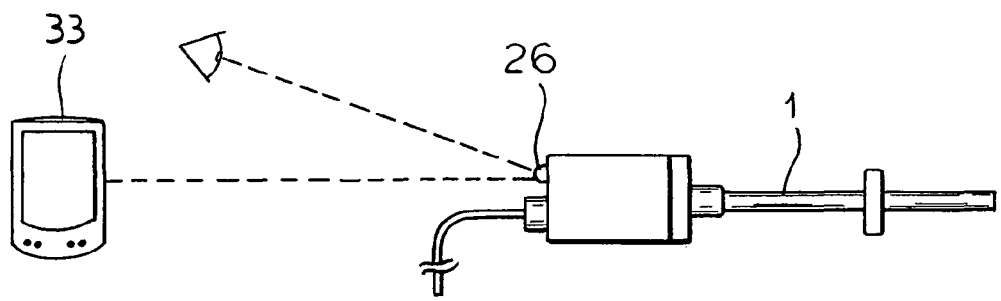
FIG. 12 is a diagram of a variant of FIG. 11.

In FIGS. 11 and 12 the sensor 1 has been shown very generally and can have an optical signal output which is detected as represented by the broken line and arrow 26. The sensor waveguide is juxtaposed with a permanent magnet 1a and the relative movement of the magnet and the sensor 1 results in a magnetic field propagation through the waveguide which is. detected by the circuitry on the circuit boards within the housing 13. The sensor 1 also has a cable connection 40 with an SPS control 29 via a T-connector 30 and into which a hand-held programmer 31 can be plugged. As an alternative to the controller 29, an interface 32 and a PC 34 can be connected by plug 41 to the T-connector 30. In this manner the parameter assignments and data collection can be achieved in a simple way.

In the illustration in FIG. 12 an optical output 26 is likewise provided but also is used for coupling (wireless connection) to a hand-held programmer 33 for the diagnostics, adjustment or setting of the sensor.

The invention is of course not limited to the embodiment described and can be modified within the bounds of the appended claims. All of the novel features described in the specification and/or shown in the drawing can be used individually or in combination with others and are considered within the scope of this invention.

We claim:

1. A magnetostrictive elongation sensor for outputting an elongation-dependent signal, comprising:
    a magnetic-field-sensitive sensor element in the form of a waveguide and forming a signal generator;
    a shiftable magnet generating a magnetic field affecting said sensor element;
    a signal processor connected to said signal generator and having a diagnostic output circuit constructed and arranged to switch said elongation sensor into a programmable mode to program the elongation sensor from a measurement mode providing an output based on a position of the magnet relative to the sensor element;
    a housing receiving said signal processor and at least an end of said sensor element, wherein said housing is provided with an output connection for the elongation sensor, the output connection being operably connected to the diagnostic circuit;
    a programming device connectable to said output connection for programming said sensor; and
    wherein the diagnostic output circuit includes a sensor unit for said output connection monitoring an output signal therefrom and providing an input in said programming mode which, upon failure of said input causes switchover to the measurement mode with a time delay.

2. The magnetostrictive elongation sensor defined in claim 1 wherein the diagnostic output circuit includes an infrared interface.

3. The magnetostrictive elongation sensor defined in claim 1 wherein the diagnostic output circuit includes an optical output element effective in a visible light wavelength range.

4. The magnetostrictive elongation sensor defined in claim 1 wherein the diagnostic output circuit includes at least one of a sensor unit for a function of the elongation sensor finding itself in the programming mode and/or a sensor unit for monitoring voltage with at least two voltage values different from zero.

5. The magnetostrictive elongation sensor defined in claim 1 wherein said signal generator includes an output signal generator deriving or producing an elongation-dependent value, converting said elongation-dependent value into a digital or analog output signal, and an interconnection circuit between said output signal generator and said sensor element, said output signal generator being connected to said signal processor, at least one of the electrical connections between said signal generator formed by said sensor element and said signal processor, and said output signal generator and said interconnection circuit being a cable-free connection between spaced apart circuit networks on separate circuit boards.

6. The magnetostrictive elongation sensor defined in claim 5 wherein at least the connection to said output signal generator is cable-free.

7. The magnetostrictive elongation sensor defined in claim 5 wherein at least one of the electrical connections is formed as a plug and jack connection.

8. The magnetostrictive elongation sensor defined in claim 5 wherein the signal generator formed by the sensor element is connected with a first circuit board by a cable-free connection, a second circuit board is provided for said signal processor and a third circuit board is provided for said output signal generators, at least said second and third circuit boards being connected by a plug-and-jack connection.

9. The magnetostrictive elongation sensor defined in claim 8 wherein all three circuit boards are connected together by plug connectors.

10. The magnetostrictive elongation sensor defined in claim 8 wherein said second and third circuit boards are disposed parallel to one another, one above the other and with broad sides facing each other, said first circuit board being disposed between said second and third circuit boards, at least the major part of the electronic components of said second and third circuit boards being provided on the sides of said second and third circuit board facing said first circuit board.

11. The magnetostrictive elongation sensor defined in claim 8 wherein said first circuit board is provided with a bandpass filter.

12. The magnetostrictive elongation sensor defined in claim 8 wherein said first circuit board is connected directly with said waveguide.

13. The magnetostrictive elongation sensor defined in claim 8 wherein the third circuit board is connected with a fourth circuit board with a plug connection, the fourth circuit board being provided with said interconnection circuit.

14. The magnetostrictive elongation sensor defined in claim 13 wherein the fourth circuit board is oriented at a right angle to a stack of said first, second and third circuit boards on a side of the stack turned away from the signal generator formed by the sensor element so that edges of the first, second and third boards turned away from said signal generator formed by the sensor element are turned toward the surface of said fourth circuit board turned toward said signal generator formed by the sensor element.

15. The magnetostrictive elongation sensor defined in claim 13, further comprising a housing of electrically conductive material forming a first shield at least in part surrounding said sensor element, an insulating shell surrounding said first shield, a housing of electrically conductive material forming a second shield surrounding said insulating shell, a shiftable magnet being positioned externally of said second shield.

16. The magnetostrictive elongation sensor defined in claim 15 wherein said signal generator formed by said sensor element and said signal processor are disposed on a common carrier within said first shield.

17. The magnetostrictive elongation sensor defined in claim 15 wherein the common carrier is one of said circuit boards or a hybrid circuit.

18. The magnetostrictive elongation sensor defined in claim 15 wherein said circuit boards are all located within said first shield.

19. The magnetostrictive elongation sensor defined in claim 18 wherein said first shield is formed with guide grooves for receiving and retaining said boards.

20. The magnetostrictive elongation sensor defined in claim 18, further comprising a shape-stable auxiliary housing of electrically nonconductive material for positioning said boards within said first shield.

21. The magnetostrictive elongation sensor defined in claim 5 wherein said signal generator formed by said sensor element has an output formed by a Villary transformer producing the elongation-dependent value, said magnetostrictive elongation sensor further comprising a passive bandpass filter between the signal processor and said waveguide.

22. The magnetostrictive elongation sensor defined in claim 21 wherein said bandpass filter is a high-pass filter.

23. The magnetostrictive elongation sensor defined in claim 21 wherein the bandpass filter and the Villary transformer are mounted on a common circuit board.

24. The magnetostrictive elongation sensor defined in claim 23 wherein the bandpass filter is a shock and vibration filter.

25. The magnetostrictive elongation sensor defined in claim 1 wherein said housing has a configuration as a hollow profile and is closed at ends by respective covers, respective seals of corresponding profile being provided between said housing and said covers, said covers having projections extending into said housing and sealed by said seals thereagainst.

26. The magnetostrictive elongation sensor defined in claim 25 wherein said seals have flat portions lying in planes between planar surfaces of the housing and the respective cover and sealing lips spaced from said flat portions and sealing against surfaces perpendicular to said planes.

27. The magnetostrictive elongation sensor defined in claim 26, further comprising tie bolts extending through said covers inwardly of said seals and along said housing for holding said covers on said housing.

28. The magnetostrictive elongation sensor defined in claim 1 wherein an optical signal transmitter is provided in said housing and said housing has a transparent portion through which an optical signal from the optical signal transmitter is detectable, the transparent portion being provided as a body of optically transparent material fitted into an opening of corresponding shape in a wall of said housing, a seal being provided between said body and said opening.

29. The magnetostrictive elongation sensor defined in claim 28 wherein said body is provided with a circumferential groove and said seal is an O-ring received in said groove and elastically stressed against the perimeter of the opening.

30. The magnetostrictive elongation sensor defined in claim 28 wherein said body abuts said wall about the perimeter of said opening.

31. The magnetostrictive elongation sensor defined in claim 30 wherein said body is flush with said wall on an exterior of said housing and has a shoulder bearing on said wall around said opening on the interior of said housing.

32. The magnetostrictive elongation sensor defined in claim 1 wherein said housing has a wall or cover portion provided with a contact arrangement engageable by a plug or jack connector having shielding connectable with shielding formed by said housing, the shielding formed by said housing and ingress protection for said contact arrangement being provided in one piece with said wall or cover portion.

33. The magnetostrictive elongation sensor defined in claim 32 wherein said contact arrangement is protected by a fitting with an internal or external screw thread, said fitting being formed in one piece with said wall portion or cover portion.

34. The magnetostrictive elongation sensor defined in claim 33 wherein said cover portion is composed of metal and is provided with a plurality of said fittings.

35. The magnetostrictive elongation sensor defined in claim 1, further comprising an optical interface including at least one of the following devices:
a diagnostics output memory device, a measured-value output memory device, a measured-value output device, a signal-type detector device, a pulse-width adjustment device, and a device for averaging a measured value over a number of measurements.

36. The magnetostrictive elongation sensor defined in claim 1 wherein conductors connected to said output connection are protected against short circuits and stray voltages.

37. A magnetostrictive elongation sensor for outputting an elongation-dependent signal, comprising:
a magnetic-field-sensitive sensor element in the form of a waveguide and forming a signal generator;
a shiftable magnet generating a magnetic field affecting said sensor element;
a signal processor connected to said signal generator and having a diagnostic output circuit;
a housing receiving at least an end of said sensor element and housing said signal processor and said generator, the housing having an output connection for providing an output signal therefrom;
a programming device connectable to said output connection for programming said sensor; and
wherein diagnostic output circuit is constructed and arranged to switch said elongation sensor into a programmable mode upon a suitable signal provided by the programming device to the output connection for programming the elongation sensor, wherein the diagnostic output circuit includes a sensor unit for monitoring the output connection and upon failure of the suitable signal being provided by the programming device causing switchover to a measurement mode of the sensor for measuring a position of the magnet relative to the sensor element.

38. The magnetostrictive elongation sensor defined in claim 37 wherein said sensor unit for said output connection is configured to respond to stray voltage, short circuit and modulation of serial data.

39. The magnetostrictive elongation sensor defined in claim 38, further comprising a time window for said sensor unit for said output connection.

40. A magnetostrictive elongation sensor for outputting an elongation-dependent signal, comprising:
a magnetic-field-sensitive sensor element in the form of a waveguide;
a shiftable magnet generating a magnetic field affecting said sensor element;
circuitry connected to said sensor element, the circuitry arranged to provide an output signal as a function of a position of the shiftable magnet in a measurement mode, the circuitry further arranged to operate in a programming mode;
a housing receiving said circuitry and at least an end of said sensor element, wherein housing is provided with an output connection for the elongation sensor connected to the circuitry to receive the output signal, and wherein the output connection is arranged to be connected to a programming device for programming said sensor;
a sensor unit for said output connection and arranged to detect input from a programming device whereupon the circuitry switches from the measurement mode to the programming mode and upon failure of input from the programming device, the circuitry switches from the programming mode back to the measurement mode.

* * * * *